H. F. SCHMIDT.
THRUST BEARING.
APPLICATION FILED APR. 29, 1918.
1,414,711.
Patented May 2, 1922.
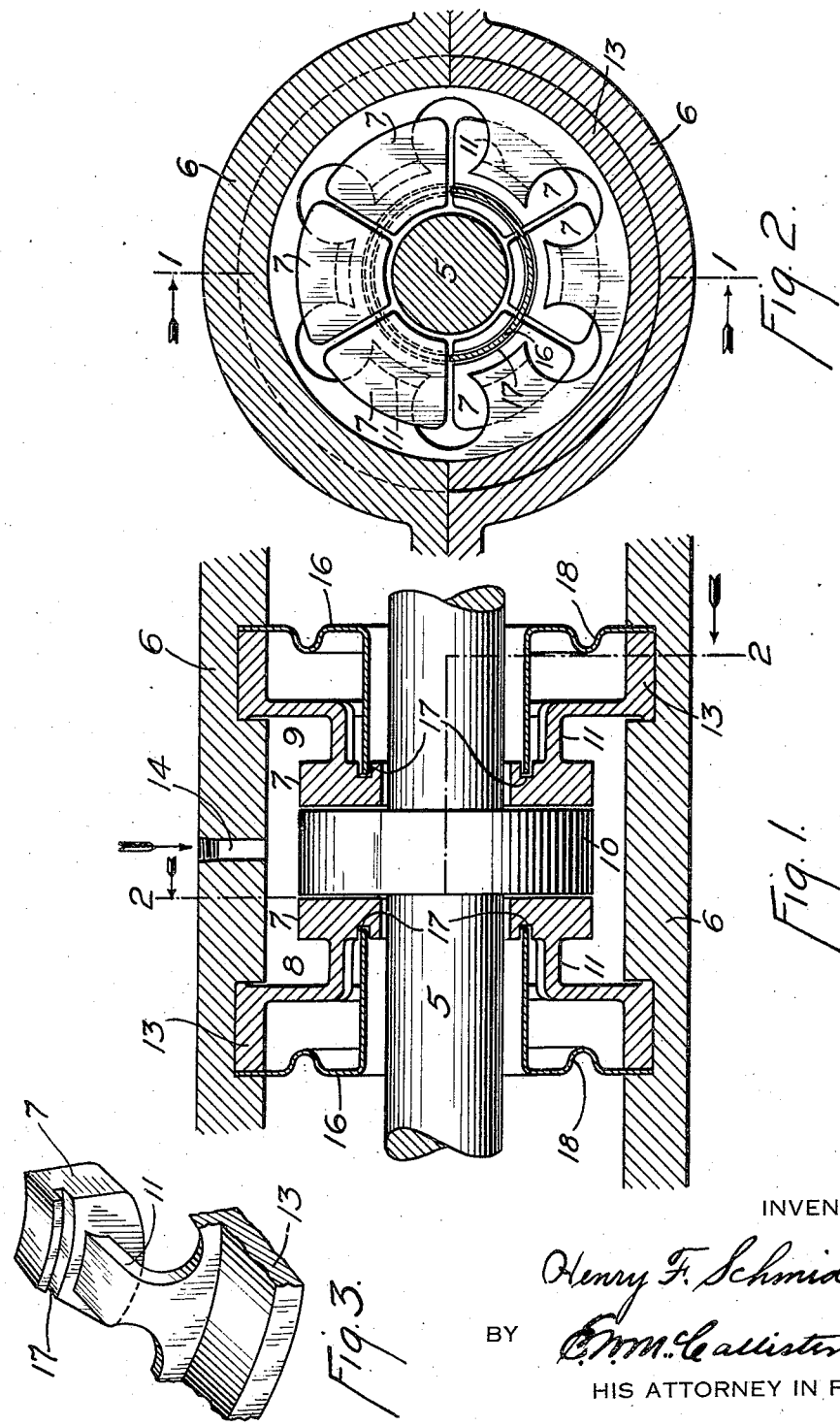
INVENTOR.
Henry F. Schmidt.
BY
HIS ATTORNEY IN FACT

UNITED STATES PATENT OFFICE.

HENRY F. SCHMIDT, OF WILKINSBURG, PENNSYLVANIA, ASSIGNOR TO WESTINGHOUSE ELECTRIC & MANUFACTURING CO., A CORPORATION OF PENNSYLVANIA.

THRUST BEARING.

1,414,711.

Specification of Letters Patent. Patented May 2, 1922.

Application filed April 29, 1918. Serial No. 231,373.

*To all whom it may concern:*

Be it known that I, HENRY F. SCHMIDT, a citizen of the United States, and a resident of Wilkinsburg, in the county of Allegheny and State of Pennsylvania, have made a new and useful Invention in Thrust Bearings, of which the following is a specification.

This invention relates to thrust bearings and has for an object to produce a new and improved thrust bearing in which relatively high pressures per unit of bearing surface may be safely employed.

A further object is to produce a thrust bearing in which means are employed for preventing undue concentration of load on any portion of the bearing surfaces.

A further object is to produce a thrust bearing of the type in which the thrust is transmitted to a stationary or foundation member by means of a series of segmental shoes, and which is simpler and more compact than other bearings of this type now in use and known to me.

A further object is to produce a thrust bearing in which improved means are employed for distributing the load across the bearing surfaces and for ensuring adequate lubrication of the surfaces.

These and other objects which will be made apparent throughout the further description of the invention are attained by means of apparatus embodying the features herein described and illustrated.

In the drawings accompanying and forming a part hereof, Fig. 1 is a more or less diagrammatic sectional view of a thrust bearing embodying my invention. The section is taken along the line 1—1 of Fig. 2 and the stationary member or casing of the bearing is shown in fragmental section for convenience of illustration.

Fig. 2 is a sectional view along the broken line 2—2 of Fig. 1.

Fig. 3 is a fragmental perspective view of a detail of apparatus embodying my invention.

The apparatus illustrated as an embodiment of my invention includes a rotatable shaft 5, a stationary member 6 for receiving the longitudinal thrust of the shaft, and a plurality of yieldingly supported agents 7 for transmitting longitudinal thrusts of the shaft to the member 6. As shown, the agents 7 are in the form of segmental shoes and are arranged in two sets 8 and 9 on opposite sides of a bearing member 10 with which the shaft 5 is provided. As illustrated, the bearing member 10 consists of a thrust collar integrally formed on the shaft or separately formed and so mounted on the shaft as to effectively transmit longitudinal thrusts of the shaft to one or the other of the two sets of shoes 7. The stationary member 6 may be of any suitable form capable of transmitting thrusts of the shaft to the foundation member, but is shown in the form of a casing for the collar 10 and the cooperating sets of shoes 7. It will, of course, be understood that the casing 6 may be mounted on a pedestal or otherwise arranged to transmit the thrust imparted to it to a foundation member, such for example as a ship's structure, in case the thrust bearing is employed in connection with the propeller shaft of a ship.

As shown, the shoes 7 are of segmental shape and the shoes of each set are equally spaced around the shaft 5 and are arranged to engage a lateral face of the collar 10. Each shoe is mounted on a resilient arm 11 and in this way is yieldingly supported by the casing 6. In the illustrated embodiment each arm is shown as integrally formed with its cooperating shoe and with a mounting ring 13 which is suitably mounted on the casing 6. All of the arms 11 cooperating with the shoes of one set are formed integrally with one ring 13. Each arm 11 is so formed and so located with relation to the shoes supported by it that the shoe is not only capable of yielding in response to longitudinal thrust of the shaft 5, but is also capable of tilting so that its bearing face is capable of moving to an angular position with relation to the cooperating bearing face of the collar 10. The longitudinal yielding of each shoe in response to longitudinal thrust imparted occasions a substantially equal distribution of pressure over all the shoes of the operating set and consequently it is practically impossible for one or more of the shoes to be materially overloaded by reason of a slight misalignment or other defect in workmanship in the bearing. For this reason, a relatively high pressure per unit of bearing surface may be safely maintained, and consequently the bearing may be made smaller and more compact than similar bearings now in use. The arrangement of the shoes whereby they may tilt ensures effective lubrication of the bearing faces and also that the longitudinal thrust imparted to each shoe is substantially uniformly distributed over the entire bearing face of the shoe. Under normal operation the tilting action takes place about a radial line intermediate the forward and trailing edges of the shoe, and results in the trapping of a relatively thick film of lubricant between the bearing face of the shoes and the adjacent face of the thrust collar. This trapping action of the lubricant may be facilitated by so mounting each shoe on its mounting arm 11 that the point of union between the shoe and the arm is located nearer the trailing edge of the shoe than the forward edge. This arrangement of the shoe with relation to its mounting arm is clearly shown in Fig. 3. A slight rounding of the forward edge of the shoe will further facilitate the oil trapping action of the shoe. It will, of course, be understood that the tilting of the shoe occasions a gradual thinning of the oil film beneath the shoe, the thicker portion of the film being located at the forward edge of the shoe and the thinner portion at the trailing edge.

Lubricant may be delivered to the bearing through a port 14 formed in the casing 6 above the shoes 7. Where a continuous flow of lubricant is maintained through the bearing the lubricant discharge port may be located at any point within the casing, but will preferably be located at or near the horizontal plane passing through the axis of the shaft, so as to ensure an adequate supply of lubricant to the collar 10. The spaces between the segmental shoes of each set form lubricant delivery passages which permit a free delivery of lubricant to the bearing faces of the collar 10. In the drawing I have illustrated baffles for deflecting the flow of lubricant and also for retaining lubricant in contact with the bearing shoes. As shown, each set of shoes cooperates with an annular baffle 16 which may be made of sheet metal and is substantially L-shaped in cross section. The outer peripheral edge of the baffle is secured to the annular casing 6 in such a way as to form an oil tight joint, whereas the other edge loosely projects into grooves 17 formed in the rear faces of the shoes and located near the shaft ends of the shoes. With this arrangement the baffles do not interfere with the relative motion of the shoes and at the same time they direct the lubricant in such a way that it cannot run through the bearing without coming in contact with the collar 10. In addition to this, the two baffles 16, one of which cooperates with each set of shoes, in effect form end walls of a lubricant chamber surrounding the shoes and are effective in retaining sufficient lubricant in contact with the bearing to adequately lubricate the bearing for a short period of time in case the oil supply fails. In order to absolutely prevent the baffle 16 from hampering the relative motion of the shoes 7, I have shown each baffle provided with an annular corrugation 18 in its radial web.

A simple method of forming each set of shoes and its cooperating arms and mounting ring 13 is to cast a blank including the ring 13, an annular web, from which the arms are subsequently formed, and a flange from which the shoes are subsequently formed. This annular blank may be machined to size, and the annular flange and web portion may then be sawed for the purpose of forming the segmental shoes and the supporting arm for the shoes. In order to render the arms sufficiently resilient to yield to the tilting forces to which the shoes are subjected under normal operation, the section of the arms are reduced to a section substantially as illustrated in Fig. 3. Any suitable means may be employed for accomplishing this reduction in the section of the arms, but it may be cheaply and effectively accomplished by drilling out the portions of the web which it is desired to remove. Fig. 2 clearly illustrates the contour obtained by so forming the arms. The bearing faces of the shoes may be formed on the flange portion of the blank before the shoes are formed by the sawing or slotting operation. The bearing illustrated in Figs. 1 and 2 is capable of resisting thrusts in either direction, one or the other sets of shoes being rendered effective by a longitudinal thrust in one direction along the shaft. It will, of course, be apparent that a thrust bearing embodying my invention may be adapted to resist thrust in one direction only and that under such circumstances the thrust shoes would preferably cooperate with a bearing face formed on the end of the shaft 5.

While I have illustrated and described but one embodiment of my invention, it will be apparent to those skilled in the art that various changes, modifications, additions and omissions may be made in the apparatus described and illustrated without departing from the spirit and scope of the invention as set forth by the appended claims.

What I claim is:

1. A thrust block for a thrust bearing comprising a rigid mounting ring having a plurality of integral flexible arms extending from the mounting ring toward the center thereof and terminating in bearing shoes capable of independent displacement.

2. A thrust block for a thrust bearing comprising a rigid mounting ring having a plurality of integral flexible arms extending from the mounting ring toward the center thereof and terminating in bearing shoes capable of independent displacement axially of the ring.

3. A thrust block for a thrust bearing comprising a rigid mounting ring having a plurality of integral flexible arms extending from the mounting ring toward the center thereof and terminating in bearing shoes capable of independent universal movement.

4. The combination with a thrust bearing for a horizontal shaft having a stationary member, a bearing member on the shaft, and segmental bearing shoes yieldingly supported by the stationary member and engaging the bearing member, of a resilient oil baffle secured to the stationary member and engaging the shoes whereby oil is confined between the bearing member and the stationary member and directed toward the contact surface of the shoes.

5. A thrust block for a thrust bearing comprising a rigid mounting ring having a plurality of integral flexible arms extending toward the centers of the rings, thence substantially at right angles and terminating in bearing shoes capable of independent displacement.

6. In a thrust bearing including stationary and rotatable members, a ring member surrounding the rotatable member and supported by the stationary member, said ring member including flexible arms extending toward the center of the ring member and thence substantially parallel to the axis of the rotatable member, and bearing shoes carried by the extensions and cooperating with the rotatable member.

7. In a thrust block for a thrust bearing, a rigid mounting ring, and a plurality of integral flexible arms offset therefrom and terminating in bearing shoes annularly disposed in a circle of less diameter than the mounting ring.

8. In a thrust block for a thrust bearing, a rigid mounting ring, a plurality of integral flexible arms offset therefrom, and bearing shoes carried thereby annularly disposed in a circle of less diameter than the mounting ring and in a different plane.

In testimony whereof, I have hereunto subscribed my name this 27th day of April, 1918.

HENRY F. SCHMIDT.

Witness:
C. W. McGhee.